Jan. 31, 1967 R. JENKINS 3,301,959

FM STEREO HIGH LEVEL DEMODULATING SYSTEM

Filed Jan. 15, 1964

INVENTOR.
RICHARD JENKINS

BY Eugene M. Whitacre

Attorney

United States Patent Office 3,301,959
Patented Jan. 31, 1967

3,301,959
FM STEREO HIGH LEVEL DEMODULATING SYSTEM

Richard Jenkins, Glenside, Pa., assignor to Radio Corporation of America, a corporation of Delaware
Filed Jan. 15, 1964, Ser. No. 337,777
2 Claims. (Cl. 179—15)

Figures 1, 2:
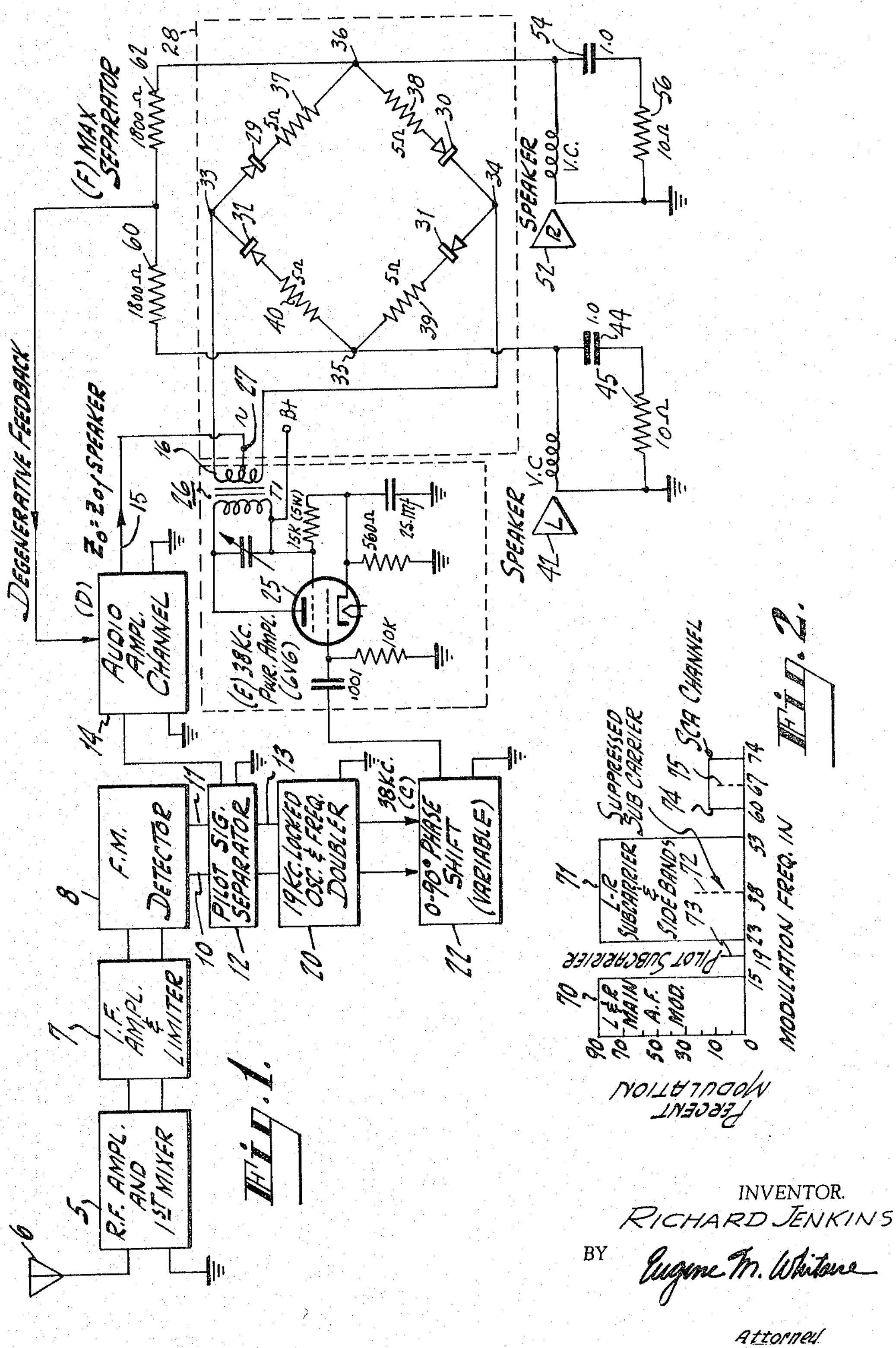

This invention relates to stereophonic frequency modulation receivers and more particularly to multiplex demodulating systems for stereophonic frequency modulation waves.

It is an object of this invention to provide an improved stereophonic frequency modulation (FM) receiver.

It is another object of this invention to provide an improved stereophonic FM receiver which can be manufactured at relatively low cost and yet provide high quality performance.

It is a further object of this invention to provide an improved stereophonic multiplex detector for adapting existing monophonic FM receiving systems for the reception of stereophonic FM transmissions.

A demodulating system for stereophonic frequency modulation receivers in accordance with the invention includes a single audio frequency amplifier channel. A received stereophonic frequency modulation signal may be processed in any suitable manner through a suitable FM tuner including a frequency demodulator. Output signals from the frequency demodulator comprise the modulation components of a received FM signal, which in the case of a stereophonic FM transmission, comprises a composite signal including (1) an audio frequency signal corresponding to the sum of a pair of stereophonically related signals, (2) sidebands of a suppressed subcarrier wave amplitude modulated by the difference between said pair of stereophonically related signals, and (3) a pilot signal of a frequency related to the frequency of said suppressed subcarrier wave. This composite signal is applied to the single audio frequency amplifier channel which has a frequency bandwidth response through the audio frequency band up to at least the frequency of the subcarrier wave.

The pilot signal is separated from the composite signal, and applied through appropriate circuitry to a tuned power amplifier or power oscillator, to develop a demodulating wave whose frequency is related to the frequency of the suppressed subcarrier. Demodulator circuit means, which may for example comprise a synchronous multiplex detector, is coupled to the audio frequency amplifier channel and to the power circuit means for receiving the amplified composite signal and the demodulating wave. The demodulator circuit means includes a pair of output terminals at which the stereophonically related signals are respectively developed at a sufficient power level to drive a pair of sound reproducing means.

A feature of the invention is that a feedback signal related to the sum of the individual stereophonic signals may be developed in the demodulator circuit means for application in inverse relation to the audio frequency amplifier channel. The feedback signal improves the phase linearity of the audio frequency amplifier channel and thereby reduces the amount of cross-talk or increases the separation between the respective stereophonically related signals.

The novel features which are considered to be characteristic of this invention are set forth with particularity in the appended claims. The invention, itself, however, both as to its organization and method of operation as well as additional objects and advantages thereof will best be understood from the following description when read in connection with the accompanying drawings in which:

FIGURE 1 is a schematic circuit diagram, partly in block form, of a stereophonic FM receiver embodying the invention; and FIGURE 2 is a graph indicating the range of frequency spectrum and modulation components of a composite modulation signal as developed in the output circuit of the FM detector of FIGURE 1.

Referring to the drawings and more particularly to FIGURE 1, the receiver circuit shown in block form is representative of a frequency modulation receiver adapted for stereophonic multiplex operation. In this respect it is provided with the usual radio frequency (R-F) amplifier and mixer 5 tunable through the frequency-modulation band of 88 to 108 megacycles (mc.), and coupled to antenna means 6. The R-F amplifier and mixer 5 is coupled to an intermediate frequency (I-F) amplifier and limiter 7 which is followed by a suitable FM detector 8. The FM detector 8 may include a suitable deemphasis network, and a pair of output terminals 10 and 11 are provided across which are developed a composite signal comprising: the $(L+R)$ signals, the subcarrier sidebands representative of the $(L-R)$ signal and the 19 kc. (kilocycle) pilot signal.

A pilot signal separator stage 12 is coupled to the output terminals 10 and 11 of the FM detector 8 to receive the composite signal. The pilot signal separator 12 separates the 19 kc. pilot signal from the remainder of the composite signal and applies the separated 19 kc. pilot signal to an output terminal 13. The remainder of the composite signal including the $(L+R)$ and the subcarrier sidebands representative of the $(L-R)$ signals are fed to an audio amplifier channel 14.

The audio amplifier channel 14 includes any suitable number of preamplifier and driver stages for driving a suitable power amplifier. As is known, the power amplifier may comprise a single-ended or push-pull output stage for delivering the amplified composite signal to an output terminal 15. Since the total bandwidth of the signals applied to the audio frequency amplifier channel 14 extends from very low audio frequencies up to 53 kc., one might expect the frequency response of the amplifier must extend to 53 kc. However excellent performance was obtained where the amplifier response extended only to 40 kc. with the response dropping off for frequencies approaching 40 kc. It is desirable that the amplifier channel provide substantially linear phase response for signals of these frequencies. The term "audio amplifier channel," is intended to apply to amplifiers which amplify signals at frequencies within and above the audible range.

The 19 kc. pilot signal from the pilot signal separator 12 is used to regenerate a switching or demodulating signal of the proper power, phase and frequency to synchronously demodulate the composite signals from the audio amplifier channel 14. Any suitable circuitry may be used for developing the switching signal, for example as shown in the drawings a 19 kc. locked oscillator and frequency doubler 20 is coupled to the output terminal 13 of the pilot signal separator 12 to generate a 38 kc. switching signal whose phase is determined by a phase shifter 22. It should be noted that the phase shifter 22 may comprise an integral portion of the oscillator and frequency doubler 20, and is used to adjust the phase of the resultant switching signal to produce minimum cross-talk between the demodulated stereophonic signals.

The 38 kc. switching signal is fed to a tuned power amplifier stage 24 which includes a tetrode tube 25. If desired other power amplifying devices such as transistors may be used. The output circuit for the tuned power amplifier stage 24 includes the primary winding of a transformer 26 which is tuned to 38 kc. The circuit components of the tuned power amplifier 24 are not critical, and hence relatively inexpensive parts may be used.

The secondary winding of the transformer 26 includes a centertap 27 which is connected to the output terminal 15 of the audio amplifier channel 14. A synchronous multiplex detector 28 includes four diodes 29, 30, 31 and 32 connected in a balance bridge configuration. One diagonal, 33–34, of the bridge is connected across the secondary winding of the transformer 26. A pair of audio output terminals 35 and 36 are connected respectively at opposite ends of the other diagonal of the bridge. Each leg of the bridge includes a resistor 37, 38, 39 and 40 of relatively small resistance value in series with the respective diode to insure a sufficient voltage drop in those legs of the bridge which are conducting to maintain the diodes in the other leg of the bridge cutoff for maximum excursions of the composite signal.

Those audio frequency signals which correspond to one of the stereophonically related signals, such as the left signals, are developed at the output terminal 35 and applied to a sound reproducing device such as to the voice coil of a loudspeaker 42. A capacitor 44 and the resistor 45 are connected in series across the loudspeaker 42 to bypass high frequency and transient components, and hence provide protection for the voice coil of the loudspeaker. In like manner the other of the stereophonically related signals, such as the right signals are developed at the output terminal 36. The signals at the terminal 36 are applied to a sound reproducing device 52, the voice coil of which is bypassed by a series capacitor 54 and resistor 56 combination for bypassing high frequency and transient voltages which might damage the loudspeaker voice coil.

A feedback circuit including a pair of resistors 60 and 62 are connected in series between the output terminals 35 and 36. The voltage which appears at the junction of the resistors 60 and 62 is a function of the sum of the respective stereophonically related signals, and is fed back in inverse relation to the audio frequency amplifier channel 14. The feedback circuit tends to linearize the phase-versus-frequency response of the audio frequency amplifier channel 14, and hence is a factor in insuring a reduced amount of cross-talk between the resultant stereophonic signals developed at the terminals 35 and 36.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the abscissa and percentage modulation along the ordinate which also indicates relative amplitudes of subcarrier signals. It will be seen that the total signal is composed of an $(L+R)$ component 70 which may provide as much as 90% modulation and an $(L-R)$ double-siedband suppressed-carrier AM signal component 71 which may also modulate the carrier up to 90% as indicated. In other words when the component 70 is maximum, the component 71 is minimum.

In the graph of FIGURE 2 it is assumed that the audio frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 72 is at 38 kc. and is the second harmonic of the 19 kc. pilot carrier represented at 73 and is maintained at a constant phase relationship. The sidebands of the suppressed subcarrier extend substantially from 23 kc. to 53 kc. as indicated, thereby to provide for substantially the full 15 kc. modulation referred to.

The possible SCA (Subsidiary Communications Allocation) background music channel is indicated by the block 74 and extends 7 kc. on either side of a 67 kc. subcarrier signal indicated by the dotted line 75.

When a stereophonic FM signal is being received by the FM receiver (and assuming an SCA signal present), a composite signal as represented in FIGURE 2 is developed across the output terminals of the FM detector 8.

In the operation of the system, the 19 kc. pilot signal is separated, doubled, phase adjusted and fed to the tuned power amplifier 24. If desired, the stage 24 may comprise a suitable oscillator circuit providing the phase of the resultant output signal is maintained in precise relation to the phase of the pilot signal. The 38 kc. power switching or demodulating signal from the tuned amplifier 24 is applied across the terminals 33 and 34 of the multiplex detector circuit 28.

The composite signal from the pilot signal separator 12 is amplified by the audio frequency amplifier channel 14, and then applied to the centertap 27 on the secondary winding of the output transformer 26. The relative maximum amplitude of the amplified composite signal to that of the switching signal is about one to two.

When the terminal 33 is driven positive relative to the terminal 34, the rectifiers 29 and 30 conduct causing a voltage to be developed at the terminal 36 which corresponds to the instantaneous value of the composite signal applied to the centertap 27. When the phase of the switching signal is properly adjusted, as by adjustment of the phase shifter 22, the output signal at the terminal 36 corresponds to one of the stereophonically related signals, such as the right (R) signal.

When the terminal 33 is driven positive relative to the terminal 34, the rectifiers 31 and 32 are non-conductive. The resistors 37 and 38 insure that sufficient positive voltage is maintained at the terminal 33 relative to terminal 34, that the composite signal cannot drive the rectifiers 31 and 32 into conduction.

When the switching signal reverses polarity and drives the terminal 33 negative relative to the terminal 34, the rectifiers 31 and 32 are conductive and the rectifiers 29 and 30 are cut-off. Under these conditions the other of the stereophonic signals, such as the left signal, is developed at the output terminal 35.

The signals appearing at the output terminals 35 and 36 are at sufficient power levels to directly drive the respective loudspeakers 42 and 52.

As noted hereinabove, a standard 75 microsecond deemphasis network is included in the FM detector circuit 8. The circuit was operated successfully with and without the deemphasis network with no noticeable degradation of the separation between the demodulated signals. However, without the deemphasis network the high frequency audio components are somewhat accentuated. It should be recognized that the deemphasis network could be removed entirely from the FM detector 8, and any control over high frequency response which may be desired can be effected by a treble frequency control, not shown in the audio amplifier channel.

What is claimed is:

1. A frequency modulated stereophonic receiver comprising:

circuit means for demodulating a received composite stereophonic frequency modulated signal to recover its modulation components, a single audio frequency amplifier channel including a wide band audio power amplifier coupled to said circuit means to receive said recovered components, a tuned power amplifier tuned to a predetermined frequency coupled to said circuit means, a high level demodulator circuit coupled to said audio power amplifier and to said tuned power amplifier for providing at respective first and second output terminals first and second high level stereophonically related audio output signals, the level of said output signals being sufficient to drive directly audio reproducing loudspeakers, first and second loudspeakers directly connected respectively to said first and second output terminals, and negative feedback means coupled to said first and second output terminals for developing a feedback signal proportional to the sum of said stereophonically related signals and for applying said feedback signal to said audio power amplifier.

2. A demodulating system for stereophonic frequency modulation receivers comprising in combination:

a pair of input terminals adapted to be coupled to the frequency modulation receiver to receive a demodulated composite stereophonic frequency modulation signal including (1) an audio frequency signal corresponding to the sum of a pair of stereophonically related signals, (2) sidebands of a suppressed subcarrier wave amplitude modulated by the difference of a pair of stereophonically related signals, and (3) a pilot signal of a frequency related to the frequency of said suppressed subcarrier wave, an amplifier coupled to said input terminals, circuit means coupled to said input terminals and responsive to said pilot signal to develop a demodulating wave whose frequency is related to the frequency of said suppressed subcarrier, demodulator circuit means coupled to said amplifier and to said circuit means for deriving said pair of stereophonically related signals, said demodulator circuit means including a first output terminal at which the one said stereophonically related signal is developed and a second output terminal at which the other of said stereophonically related signal is developed, said output terminals adapted to be individually connected to a pair of sound reproducing devices, feedback means coupled to the demodulator circuit means for developing a signal proportional to the sum of said pair of stereophonically related signals, and means for applying said feedback signal in inverse relation to said amplifier.

References Cited by the Examiner

UNITED STATES PATENTS

| | | | |
|---|---|---|---|
| 3,070,662 | 12/1962 | Eilers | 179—15 |
| 3,167,615 | 1/1965 | Wilhelm et al. | 179—15 |

DAVID G. REDINBAUGH, *Primary Examiner.*

ROBERT L. GRIFFIN, *Examiner.*